United States Patent
Maerten et al.

(10) Patent No.: US 12,276,765 B2
(45) Date of Patent: Apr. 15, 2025

(54) IMPLICIT PROPERTY MODELING

(71) Applicant: Schlumberger Technology Corporation, Sugar Land, TX (US)

(72) Inventors: Frantz Maerten, Pignan (FR); Emmanuel Malvesin, Montpellier (FR); Julien Renaudeau, Asker (NO); Tormod Slettemeas, Asker (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 510 days.

(21) Appl. No.: 17/309,439

(22) PCT Filed: Nov. 27, 2019

(86) PCT No.: PCT/US2019/063572
§ 371 (c)(1),
(2) Date: May 27, 2021

(87) PCT Pub. No.: WO2020/112974
PCT Pub. Date: Jun. 4, 2020

(65) Prior Publication Data
US 2022/0026593 A1   Jan. 27, 2022

Related U.S. Application Data

(60) Provisional application No. 62/772,607, filed on Nov. 28, 2018.

(51) Int. Cl.
*G01V 1/28* (2006.01)
*G06F 30/28* (2020.01)

(52) U.S. Cl.
CPC .............. *G01V 1/282* (2013.01); *G06F 30/28* (2020.01); *G01V 2210/6224* (2013.01); *G01V 2210/6246* (2013.01); *G01V 2210/66* (2013.01)

(58) Field of Classification Search
CPC ........... G01V 1/282; G01V 2210/6224; G01V 2210/6246; G01V 2210/66; G01V 99/005;
(Continued)

(56) References Cited

U.S. PATENT DOCUMENTS

| | | | | |
|---|---|---|---|---|
| 8,315,845 B2* | 11/2012 | Lepage | ................. | G01V 11/00 703/10 |
| 2008/0154505 A1* | 6/2008 | Kim | ........................ | E21B 43/00 702/2 |

(Continued)

FOREIGN PATENT DOCUMENTS

| | | | |
|---|---|---|---|
| WO | 2006127151 A1 | 11/2006 | |
| WO | 2009079123 A1 | 6/2009 | |

(Continued)

OTHER PUBLICATIONS

Wikipedia "Marching squares", pp. 1-10; https://en.wikipedia.org/wiki/Marching_squares (Year: 2017).*

(Continued)

*Primary Examiner* — Michael J Dalbo
*Assistant Examiner* — Kaleria Knox
(74) *Attorney, Agent, or Firm* — Jeffrey D. Frantz

(57) ABSTRACT

A method of simulating a process of a geological structure includes obtaining a first digital model including structural data representing a geological structure. The method also includes selecting at least one marching technique based in part on a grid dimension and a grid cell shape of a grid on the first digital model. The method further includes applying the at least one marching technique to at least a portion of the structural data of the first digital model to identify at least some boundary data. The method further includes populating a second digital model based in part on the first digital model, a property, and the boundary data. The method (Continued)

further includes simulating a process of the geological structure using the second digital model.

16 Claims, 10 Drawing Sheets

(58) Field of Classification Search
CPC ......... G01V 11/00; G06F 30/28; G06F 30/23; G06F 18/214; G06Q 30/02
See application file for complete search history.

(56) References Cited

U.S. PATENT DOCUMENTS

| | | | |
|---|---|---|---|
| 2010/0051280 A1* | 3/2010 | Akram | G06Q 30/0201 703/2 |
| 2012/0029827 A1* | 2/2012 | Pepper | G01V 1/282 702/16 |
| 2012/0215513 A1 | 8/2012 | Branets et al. | |
| 2013/0096899 A1* | 4/2013 | Usadi | G06F 30/23 703/10 |
| 2014/0136171 A1* | 5/2014 | Sword, Jr. | G01V 11/00 703/10 |
| 2016/0103245 A1* | 4/2016 | Pyrcz | G01V 99/005 703/2 |
| 2016/0245951 A1 | 8/2016 | Kartasheva et al. | |
| 2017/0205531 A1* | 7/2017 | Berard | E21B 7/04 |
| 2020/0160173 A1* | 5/2020 | Pandey | G06F 18/214 |

FOREIGN PATENT DOCUMENTS

| | | | |
|---|---|---|---|
| WO | 2009137176 A2 | 11/2009 | |
| WO | 2014/149802 A1 | 9/2014 | |
| WO | WO-2016001697 A1 * | 1/2016 | ............. G01V 1/301 |

OTHER PUBLICATIONS

Pablished by SPE International, PetroWiki "Gridding in reservoir simulation", pp. 1-10; https://petrowiki.spe.org/Gridding_in_reservoir_simulation (Year: 2014).*

Extended European Search Report issued in European Patent Application No. 19888595.6 dated Jun. 30, 2022, 6 pages.

Search Report and Written Opinion of International Patent Application No. PCT/US2019/063572 mailed Mar. 23, 2020.

International Preliminary Report on Patentability dated May 25, 2021 for PCTUS2019063572 (8 pages).

Communication pursuant to Article 94(3) issued in European Patent Application No. 19888595.6 dated Mar. 13, 2024, 7 pages.

* cited by examiner

IMPLICIT PROPERTY MODELING

CROSS REFERENCE PARAGRAPH

This application is a National Stage Entry of International Application No. PCT/US2019/063572, filed Nov. 27, 2019, which claims the benefit of U.S. Provisional Application No. 62/772,607, entitled "IMPLICIT PROPERTY MODELING," filed Nov. 28, 2018, the disclosure of which is hereby incorporated herein by reference.

BACKGROUND

Seismic surveys may be used to develop models of a geological domain. Such a domain may include an oilfield, for example. In particular, such a domain may include stratified terrains in the Earth's subsurface. Once a seismic survey is used to develop a model of such stratified domains, the model may be populated with properties corresponding to the various layers.

However, stratified subsurface layers are frequently not continuous and may instead include folds, faults, and other discontinuities. Existing techniques for populating properties into models that include such discontinuous layers may be complex, computationally-intensive, and inaccurate. For example, one possibility for populating properties into a complex folded and faulted geological domain is to use restoration in order to work into a more simple unfolded and un-faulted space. However, using restoration involves intensive computations. Such computations consume massive amounts of computational resources, and can give inaccurate results. For example, existing restoration techniques can take on the order of several minutes to over an hour to compute.

SUMMARY

Embodiments of the present disclosure may provide a computer implemented method of simulating a process of a geological structure. The method includes obtaining a first digital model including structural data representing a geological structure; selecting at least one marching technique based in part on a grid dimension and a grid cell shape of a grid on the first digital model; applying the at least one marching technique to at least a portion of the structural data of the first digital model to identify at least some boundary data; populating a second digital model based in part on the first digital model, a property, and the boundary data; and simulating a process of the geological structure using the second digital model.

In some embodiments, the method may include additional features, including any one or more of the following. The structural data of the first digital model may include an implicit function that maps geological positions to numeric representations of geological properties at the geological positions. The geological structure may have at least one discontinuous layer including two or more disjoint portions, and the boundary data may associate the two or more disjoint portions of the at least one discontinuous layer together as part of the geological structure. The grid may be two-dimensional and define at least a plurality of polygons, and the at least one marching technique may include at least one marching polygon technique. The grid may define at least a plurality of squares, and the at least one marching polygon technique may include a marching squares technique. The grid may define at least a plurality of non-square polygons, and the at least one marching polygon technique may include a marching non-square polygon technique. The grid may be three-dimensional and defines at least a plurality of polyhedrons, and the at least one marching technique may include at least one marching polyhedron technique. The grid may define at least a plurality of cubes, and the at least one marching polyhedron technique may include a marching cubes technique. The grid may define at least a plurality of non-cube polyhedrons, and the at least one marching polyhedron technique may include a marching non-cube polyhedron technique. The property may include at least one of: porosity, permeability, density, or material type. The method may further include imposing the grid on the first digital model.

Embodiments of the present disclosure may provide a system for simulating a process of a geological structure. The system includes at least one electronic persistent memory storing a first digital model including structural data representing a geological structure; and at least one electronic processor that executes instructions to perform operations including: selecting at least one marching technique based in part on a grid dimension and a grid cell shape of a grid on the first digital model; applying the at least one marching technique to at least a portion of the structural data of the first digital model to identify at least some boundary data; populating a second digital model based in part on the first digital model, a property, and the boundary data; and simulating a process of the geological structure using the second digital model.

Embodiments of the present disclosure may also provide a non-transitory computer-readable medium storing instructions that, when executed, are configured to cause a computing system to perform operations. The operations include obtaining a first digital model comprising structural data representing a geological structure, selecting at least one marching technique based in part on a grid dimension and a grid cell shape of a grid on the first digital model, applying the at least one marching technique to at least a portion of the structural data of the first digital model to identify at least some boundary data, populating a second digital model based in part on the first digital model, a property, and the boundary data, and simulating a process of the geological structure using the second digital model.

Embodiments of the present disclosure may further provide a computing system configured to obtain a first digital model comprising structural data representing a geological structure, select at least one marching technique based in part on a grid dimension and a grid cell shape of a grid on the first digital model, apply the at least one marching technique to at least a portion of the structural data of the first digital model to identify at least some boundary data, populate a second digital model based in part on the first digital model, a property, and the boundary data, and simulate a process of the geological structure using the second digital model.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of examples. However, it will be apparent to one of ordinary skill in the art that examples may be practiced without these specific details. In other instances, well-known methods, procedures, components, circuits and networks have not been described in detail so as not to unnecessarily obscure aspects of the embodiments.

The terminology used in the description herein is for the purpose of describing particular embodiments and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Some embodiments simulate geological processes in a geological domain. To do so, such embodiments identify boundary data defining boundaries between geological layers. Moreover, embodiments can associate disjoint segments of discontinuous layers. Once the boundary data is identified and the disjoint segments of the discontinuous layers associated, the process simulation may proceed. The simulated process may include a fluid flow, e.g., due to fluid extraction or fluid injection. Embodiments are superior to existing techniques such as restoration, which may produce erroneous results that the present embodiments avoid. Moreover, embodiments may produce a digital model suitable for simulating processes much faster than existing techniques. For example, restoration may take several minutes to over an hour to complete, whereas embodiments may provide a more accurate result in less than a second using equivalent processing power. Some embodiments produce such a result in several milliseconds.

I. Oilfield Operations & Seismic Monitoring

Figure 1:
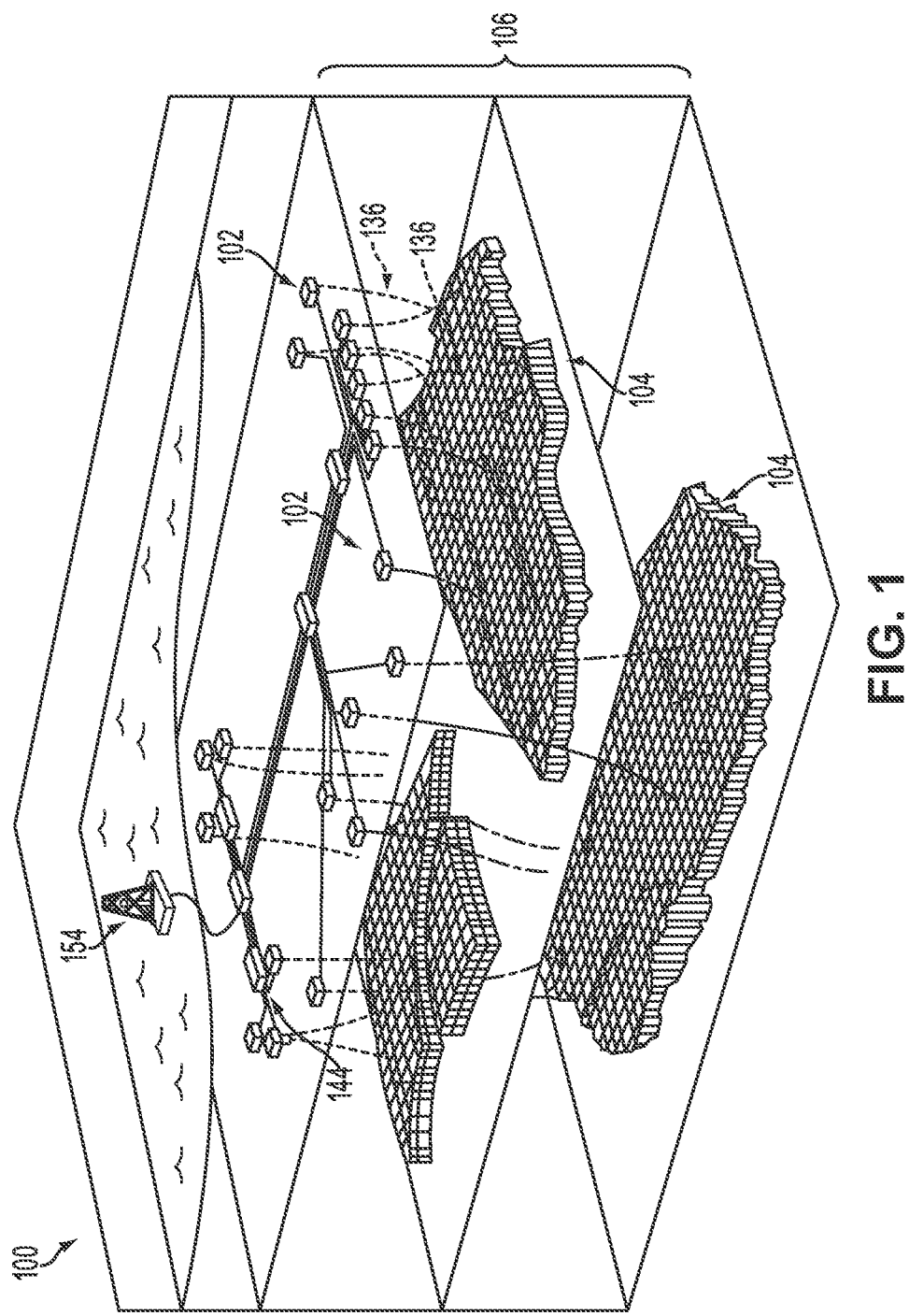
FIG. 1 illustrates a simplified, schematic view of an oilfield and its operation, according to an embodiment.
Figure 2:
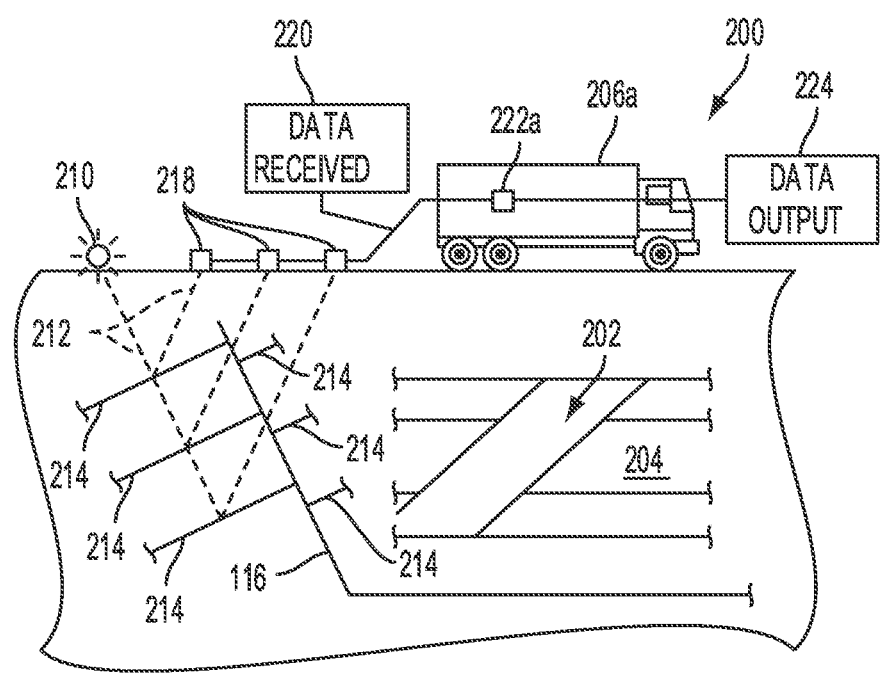
FIG. 2 illustrates a simplified, schematic view of an oilfield with a seismic survey truck, according to an embodiment.
Figure 3:
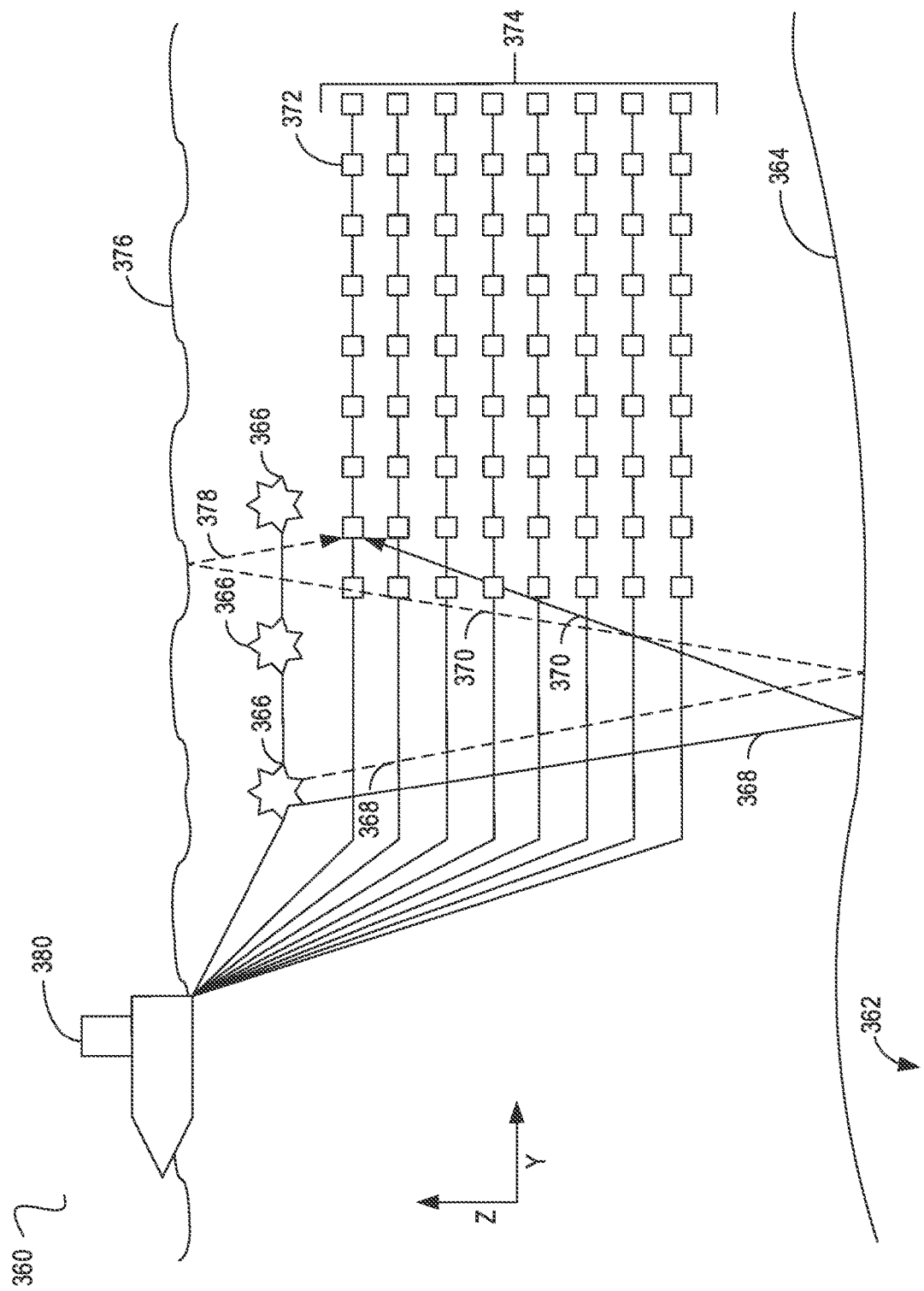
FIG. 3 illustrates a simplified, schematic view of an oilfield with a marine seismic streamer, according to an embodiment.

FIGS. 1, 2, and 3 illustrate example oilfields as contemplated for various examples. Simulations—including simulating a process of a geological structure—conducted on structures within such oilfields as shown and described in reference to these figures, may benefit from the techniques disclosed herein.

FIG. 1 illustrates an oilfield 100 in accordance with embodiments of various technologies and techniques described herein. As shown, the oilfield has a plurality of wellsites 102 operatively connected to central processing facility 154. The oilfield configuration of FIG. 1 is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

The wellsite 102 has equipment that forms wellbores 136 into the earth. The wellbores extend through subterranean formations 106, including reservoirs 104. These reservoirs 104 contain fluids, such as hydrocarbons. The wellsites draw fluid from the reservoirs and pass them to the processing facilities via surface networks 144. The surface networks 144 have tubing and control mechanisms for controlling the flow of fluids from the wellsite to processing facility 154.

FIG. 2 shows a simplified, schematic view of an oilfield with a seismic survey truck according to some examples. As shown, oilfield 200 has subterranean formation 202 containing petroleum reservoir 204 therein. FIG. 2 also illustrates a seismic survey operation being performed by a survey tool, such as seismic survey truck 206a, to measure properties of the subterranean formation. The survey operation may include an expedient for producing sound vibrations. In FIG. 2, such sound vibration, e.g., sound vibration 212 generated by seismic source 210 (e.g., a seismic shot), reflects off horizons 214 in earth formation 116. Some seismic monitoring, e.g., microseismic monitoring, may omit use of actively generated sound vibrations, instead detecting vibrations resulting from hydraulic fracturing, for example. A set of sound vibrations is received by sensors, such as geophone receivers 218 (a type of seismic receiver), situated on the earth's surface. Geophone receivers 218 may include multiple sensors that measure one or more of pressure, particle acceleration in the vertical direction, and/or particle acceleration in a direction within the horizontal plane (e.g., in one or both of the directions of x- and y-axes situated on a plane parallel to the ground). The data received 220 is provided as input data to a computer 222a of a seismic survey truck 206a, and responsive to the input data, computer 222a generates seismic data output 224. This seismic data output may be stored, transmitted or further processed as desired, for example, as disclosed herein.

Computer facilities may be positioned at various locations about the oilfield 200 and/or at remote locations, e.g., on seismic survey truck 206a. Such computer facilities may be used to communicate with the drilling tools and/or offsite operations, as well as with other surface or downhole sensors. Seismic survey truck 206a is capable of communicating with the drilling tools to send commands to the drilling tools, and to receive data therefrom. Seismic survey truck 206a may also collect data generated during the drilling operation and produce data output 224, which may then be stored or transmitted.

Note that the technology and elements of FIGS. 1 and 2 may be present in the same oilfield and interact as described presently. That is, oilfield 100 and oilfield 200 may be the same oilfield.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may deviate from the drilling plan. Additionally, as drilling, hydraulic fracturing, or other operations are performed, the subsurface conditions may change. The earth model may also be adjusted as new information is collected.

While FIG. 2 illustrates tools used to measure properties of an oilfield, it will be appreciated that the tools may be used in connection with non-oilfield operations, such as gas fields, mines, aquifers, storage (e.g., carbon dioxide storage), or other subterranean facilities. Also, while certain data acquisition tools are depicted, it will be appreciated that various measurement tools capable of sensing parameters, such as pressure, particle acceleration in the direction of any or all three-dimensional axes, seismic two-way travel time, density, resistivity, production rate, etc., of the subterranean formation and/or its geological formations may be used.

The field configurations of FIGS. 1 and 2 are intended to provide a brief description of an example of a field usable with oilfield application frameworks. Part, or the entirety, of oilfields 100 and 200 may be on land, water and/or sea. Also, while a single field measured at a single location is depicted, oilfield applications may be utilized with any combination of one or more oilfields, one or more processing facilities and one or more wellsites.

FIG. 3 shows a simplified, schematic view of an oilfield with a marine seismic streamer according to some examples. That is, FIG. 3 illustrates a side view of a marine-based seismic survey 360 of a subterranean subsurface 362 in accordance with one or more embodiments of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time. In some embodiments, the seismic waves are produced by hydraulic fracturing operations.

The component(s) of the seismic waves 368 may be reflected and converted by seafloor surface 364 (i.e., reflector), and seismic wave reflections 370 may be received by a plurality of seismic receivers 372 (here, marine seismic receivers). In some examples, seismic receivers are employed without the use of artificial seismic wave sources; such embodiments may instead detect vibrations produced by hydraulic fracturing. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one embodiment, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic survey data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one embodiment, the seismic data may be processed to generate a seismic image of the subsurface 362.

Marine seismic acquisition systems tow the streamers in streamer array 374 at the same depth (e.g., 5-10 m). However, marine based survey 360 may tow the streamers in streamer array 374 at different depths such that seismic data may be acquired and processed in a manner that avoids the effects of destructive interference due to sea-surface ghost waves. For instance, marine-based survey 360 of FIG. 3 illustrates eight streamers towed by vessel 380 at eight different depths. The depth of the individual streamers may be controlled and maintained using the birds disposed on the streamers.

II. Determining Boundary Data for use with Simulations

Figure 4:
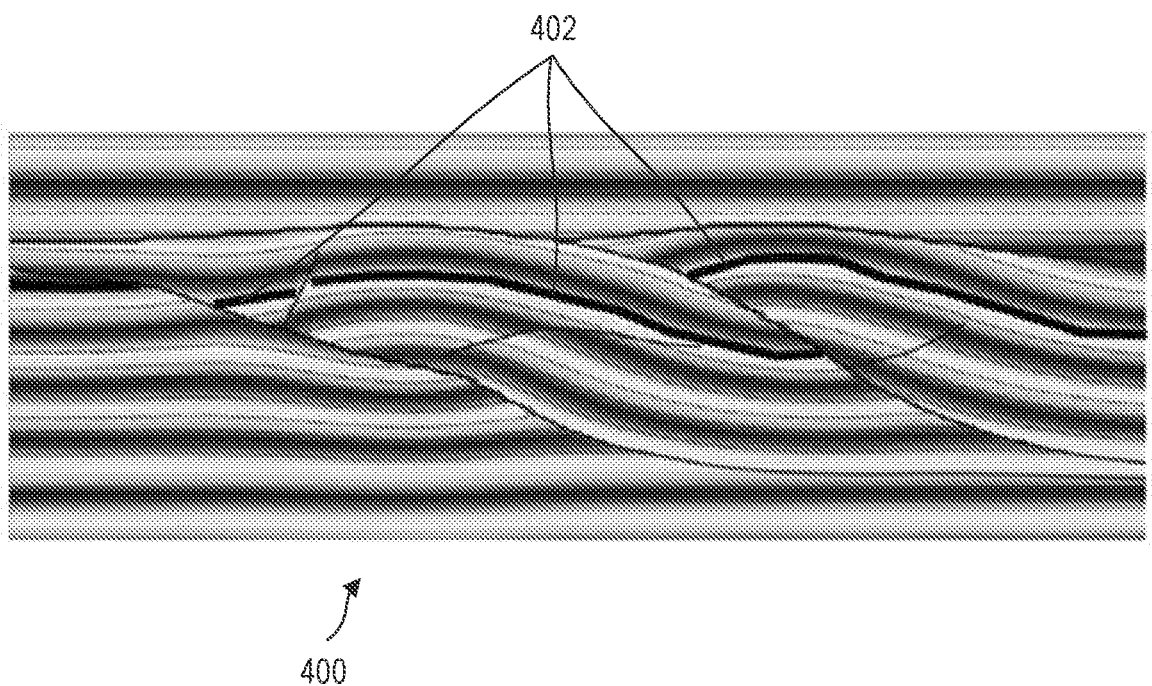
FIG. 4 illustrates a simplified, schematic view of a complex folded and faulted geological domain, according to an embodiment.

FIG. 4 illustrates a simplified, schematic view of a complex folded and faulted geological domain 400, according to an embodiment. In the folded and faulted geological domain 400, layer 402 is discontinuous, including three separated portions as shown.

Geological domains, such as geological domain 400, may be represented in digital models for the purpose of simulating processes thereof. The various shades of grey in the view of the complex folded and faulted geological domain 400 represent different materials in the geological domain. In terms of a digital model thereof, the different shades of grey may represent values of an implicit function. Such an implicit function accepts as input a coordinate of a represented geological domain, and outputs a value corresponding to a material present at the location of the coordinate.

The digital models may then be used for a variety of applications. Such applications include simulations of fluid flow, e.g., due to fluid extraction or injection, and wellbore insertion.

Toward representing a geological domain, such as geological domain 400, in digital models, various layers may be demarcated by boundary data. When such layers are discontinuous, e.g., as in the case of folded or faulted layers, the discontinuous segments may be associated in some manner, even though they are not physically connected. According to some embodiments, discontinuous segments are associated using marching squares techniques, and generalizations thereof, described in detail herein.

Note that geological domain 400 is represented in two dimensions in FIG. 4. However, embodiments are not limited to consideration of two-dimensional representations of such domains. Some embodiments operate on three-dimensional electronic representations of geological domains. That is, embodiments may be used to populate properties into both two-dimensional and three-dimensional digital models of geological domains.

Figure 5:
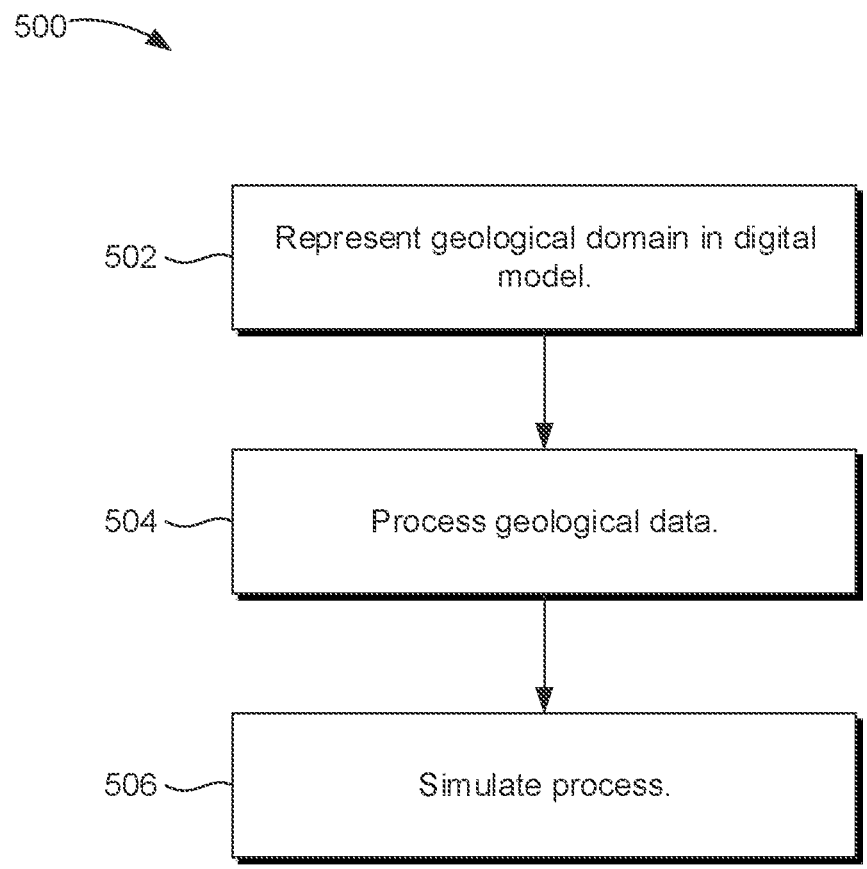
FIG. 5 illustrates a flowchart of a method of simulating a process of a geological structure, according to an embodiment.

FIG. 5 is a flowchart illustrating a method 500 according to an embodiment. The method 500 of FIG. 5 may be implemented on a system such as that shown and described in reference to FIG. 8, for example. Further, it will be appreciated that the illustrated and below-described blocks in this method 500 may be combined, separated into two or more blocks, re-ordered, or performed simultaneously (e.g., in parallel).

At block 502, the method 500 includes representing a geological domain by a digital model. The process of representing a geological domain may include gathering data using a seismic survey, one or more downhole measurements, well logs, core samples, etc. The gathered data may then be used to generate an electronic representation of the geological domain in a digital model.

In particular, the digital model may include an implicit function, associating values to coordinates represented in the digital model of the geological domain. In general, physical properties of a geological domain, such as porosity, permeability, density, and material type, may be determined using geostatistical methods. Such methods may interpolate such properties on the basis of relatively sparse empirical data, such as measurements obtained from wells. The properties may be represented in the digital model by the implicit function. Interpolation may be used to fill in values at coordinates that do not correspond to empirical measurement locations.

At block 504, the method 500 includes processing the geological data. Part of the processing of block 504 may include identifying boundary data and associating disjoint segments of discontinuous layers. Such identifying and associating may be performed using a marching squares technique, or a generalization thereof, as discussed with reference to FIG. 6, below. In particular, such techniques may produce boundary data that associates disjoint segments of discontinuous layers.

Once any disjoint segments of a given layer are associated and a given property is known to exist within one such segment, the property may be represented in the segments of the given layer in the digital model. For example, a given property may be populated into an enclosed boundary represented in the digital model by ascribing a value corresponding to the property to the represented space within the boundary.

At block 506, method 500 simulates a process of the geological domain using the populated digital model. Many processes may be simulated. Examples of such processes include fluid extraction, fluid injection (e.g., for hydraulic fracturing operations), wellbore insertion, any geomechanical process, and the like. The results of such simulating may be used to determine whether proposed actions on the represented geological domain may be implemented in practice. Thus, following a simulation of fluid extraction, fluid injection, or wellbore insertion, actual fluid extraction, fluid injection, or wellbore insertion may be performed on the represented geological domain.

Figure 6:
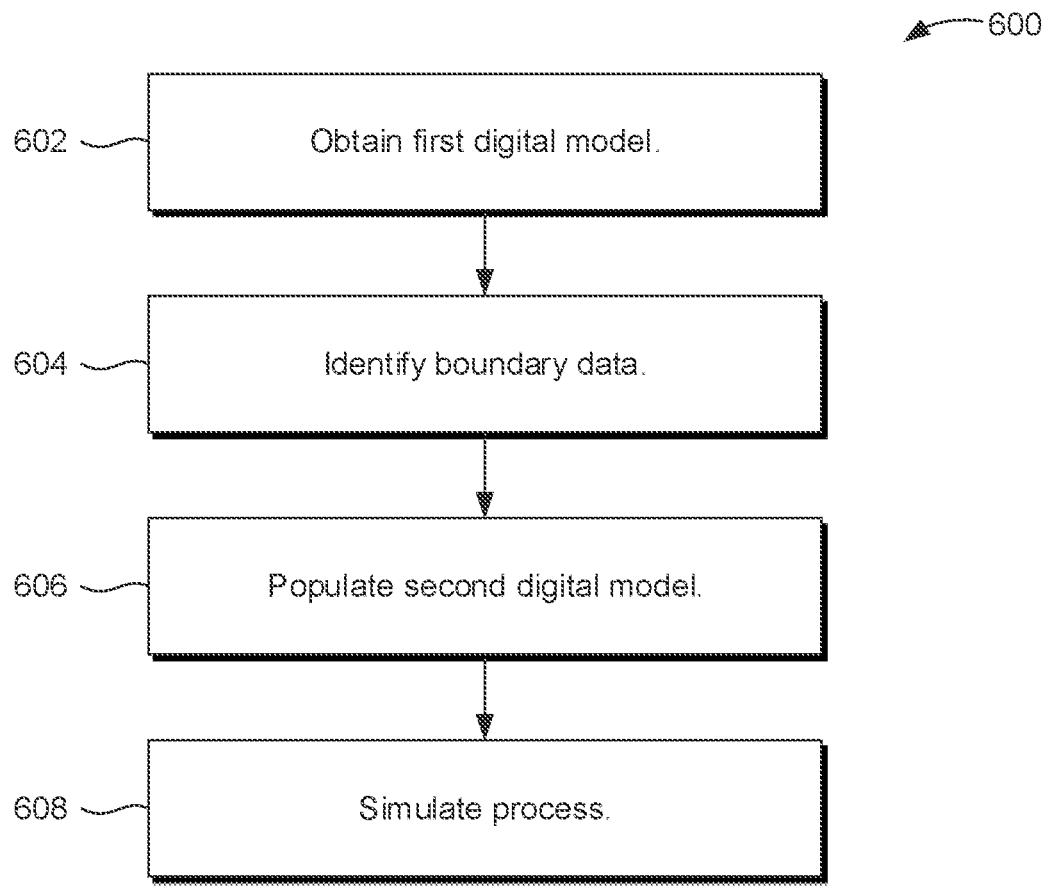
FIG. 6 illustrates a flowchart of a method of simulating a process of a geological structure, according to an embodiment.

FIG. 6 is a flowchart illustrating a method 600 according to an embodiment. The method 600 of FIG. 6 may be implemented on a system such as that shown and described in reference to FIG. 8, for example. Further, it will be appreciated that the illustrated and below-described blocks in this method 600 may be combined, separated into two or more blocks, re-ordered, or performed simultaneously (e.g., in parallel).

At block 602, the method 600 obtains a first digital model of a geological domain. The first digital model may be obtained by retrieval from electronic persistent memory, for example, or from an entity that generates, possesses, or has access to the first digital model. Such retrieval may be over a local network, from an attached electronic persistent storage device, or over a wide area network such as the internet. The first digital model may include some amount of boundary data representing disjoint layers, or disjoint segments thereof, of the geological domain. However, at this stage, disjoint segments of a layer may not be associated in the first digital model.

In some examples, obtaining the first digital model is a separate, independent process from the process of obtaining the data represented in the first digital model by empirical measurement. Thus, in some embodiments, seismic data may be measured by one entity through the usage of, for example, geophones or seismic streamers towed by a marine vehicle, and then transferred or stored in an electronic persistent or transitory memory. A different entity, or the same entity, may then obtain the seismic data by electronically accessing the electronic persistent memory, whether directly or over a network. Thus, the data may be measured using the instrumentation shown and described above in reference to FIGS. 1-3, for example, or in a variety of other ways, and then used to generate the first digital model that is obtained at this block. The first digital model may be locally (or remotely) stored for later retrieval from electronic persistent memory, transmitted to a receiving application, or otherwise utilized.

At block 604, the method 600 identifies boundary data for the geological domain in the first digital model. The boundary data identification may proceed through the use of a marching technique, such as marching squares or a generalization thereof, according to an implicit function of the first digital model obtained at block 602, as described presently.

For two-dimensional digital models, the implicit function may define isolines (lines having the same value in their implicit function) and isobands (areas between isolines) in the first digital model. Such isolines may represent boundaries between layers in the geological domain, and the isobands may represent the materials comprising such layers. For three-dimensional digital models, the implicit function may define isosurfaces (surfaces having the same value in the implicit function) and volumetric objects between such surfaces, analogous to the two-dimensional isobands. However, the implicit function does not a priori associate disjoint segments of a discontinuous layer represented in the first digital model. Rather, such boundary data merely reflects the various layers and segments thereof, as well as their relative positions, without denoting any correspondence between disjoint segments of discontinuous layers.

Thus, a marching technique may be used to generate contours corresponding to implicit function isolines (respectively, isosurfaces). Such contours may encompass isobands (respectively, volumetric objects) representing disjoint segments of a discontinuous layer. Isobands corresponding to disjoint segments from the same discontinuous layer will have matching implicit function values; the analogues situation holds for discontinuous volumetric objects in three dimensions. Such matching implicit function values permit some examples to associate disjoint segments from the same discontinuous layer.

In general, marching techniques, such as marching squares, impose contours corresponding to isolines (respectively, isosurfaces) on electronic representations. Thus, marching techniques produce boundary data in the form of isolines (respectively, isosurfaces). Such techniques utilize a grid imposed on the representation. The grid used may be already imposed in the model, e.g., from an earlier interpolation or other processing of the model, or may be imposed for purposes of implementing the marching technique. The grid may be two-dimensional (for two-dimensional digital models) or three-dimensional (for three-dimensional models). Grid cells in two-dimensional representations are two-dimensional polygons, and the marching technique selects a contour from a limited library of cell contours to represent the isoline in the particular grid cells. Grid cells in three-dimensional representations are three-dimensional polyhedrons, and the marching technique selects a contour (a surface) from a limited library of cell contours to represent the isosurface in a particular grid cell. Thus, the particular marching technique used may depend on the dimension of the first digital model and the grid imposed thereon.

For two-dimensional digital models and grids, any of a variety of two-dimensional marching techniques may be used. Marching techniques in two-dimensions are referred to herein as "marching polygon techniques", after the known marching squares technique. However, marching polygon techniques as contemplated herein are not limited to marching squares. For example, for a two-dimensional grid of triangular cells, a marching triangle technique may be used. Other cell polygons have associated marching techniques.

For three-dimensional digital models and grids, any of a variety of three-dimensional marching techniques may be used. Marching techniques in three-dimensions are referred to herein as "marching polyhedron techniques", after the known marching cubes technique. However, marching polyhedron techniques as contemplated herein are not limited to marching cubes. For example, for a three-dimensional grid of triangular prism cells, a marching triangular prism technique may be used. Other cell polyhedrons have associated marching techniques.

Note that grids as contemplated herein may be hybrid grids, that is, containing more than one cell shape. For example, a two-dimensional hybrid grid may include both a grid of square cells and a grid of triangular cells. The square-celled grid may abut the triangular-celled grid in such hybrid grids. In the case of hybrid grids, more than one marching technique may be utilized, corresponding to the more than one cell shape.

Note that marching techniques are very fast, as they operate on a cell-by-cell basis and may utilize a lookup table to match the contents of the cells to corresponding contours from the limited library.

Thus, selecting a marching technique to apply to a particular first digital model depends in part on the dimension of the first digital model, as well as the cell shape of any existing grid. (For instances where there is no pre-existing grid, a grid with any selected cell shape may be imposed.) For example, for two-dimensional digital models having a grid of regular squares, marching squares may be selected. For two-dimensional digital models lacking a grid, a grid of squares may be imposed and marching squares may be selected. For three-dimensional digital models having a grid of regular cubes, marching cubes may be selected. For three-dimensional digital models lacking a grid, a grid of cubes may be imposed and marching cubes may be selected.

Once a marching technique for the particular first digital model and grid is selected, the marching technique may be applied to determine isolines (respectively, isosurfaces) in the first digital model. Application of marching techniques is known, and may proceed accordingly to identify isolines (respectively, isosurfaces).

Once the selected marching technique is applied, the produced contours may be used to associate disjoint segments of discontinuous layers in the first digital model. This may proceed by detecting isobands (respectively, volumetric objects) that include matching implicit function values.

At block 606, the technique 600 may populate a second digital model with one or more properties according to the first digital model and the boundary data (e.g., isolines for two-dimensional digital models, isosurfaces for three-dimensional digital models) identified at block 604. The second digital model may be constructed from the first digital model and may include data representing such properties for the appropriate locations. For example, the second digital model may be constructed from the first digital model by extending the implicit function, or by adding a new implicit function, which represents the added property or properties.

Notably, the technique 600 at block 606 may populate a second digital model with a property throughout disjoint segments of a discontinuous layer. Using the boundary data produced by the marching technique of the previous block, the actions of this block may include identifying segments that include matching implicit function values, and fully populate such segments with matching values. Such populating may serve to fill in any gaps for the implicit function, for example.

At block 608, the method 600 simulates a process using the second digital model. The simulating may include simulating fluid flow, e.g., due to fluid extraction or injection, and wellbore insertion. Known techniques may be used, taking advantage of the populated property of the second digital model.

Figure 7A:
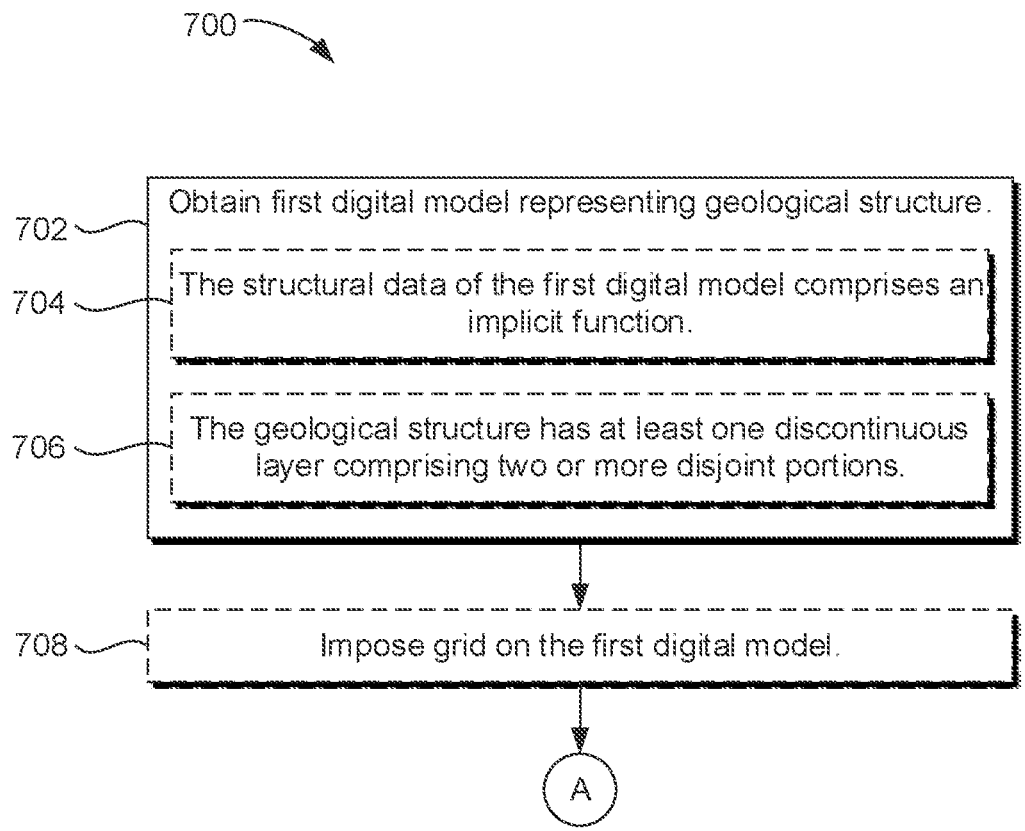
FIGS. 7A, 7B, and 7C illustrate a flowchart of a method of simulating a process of a geological structure, according to an embodiment.
Figure 7B:
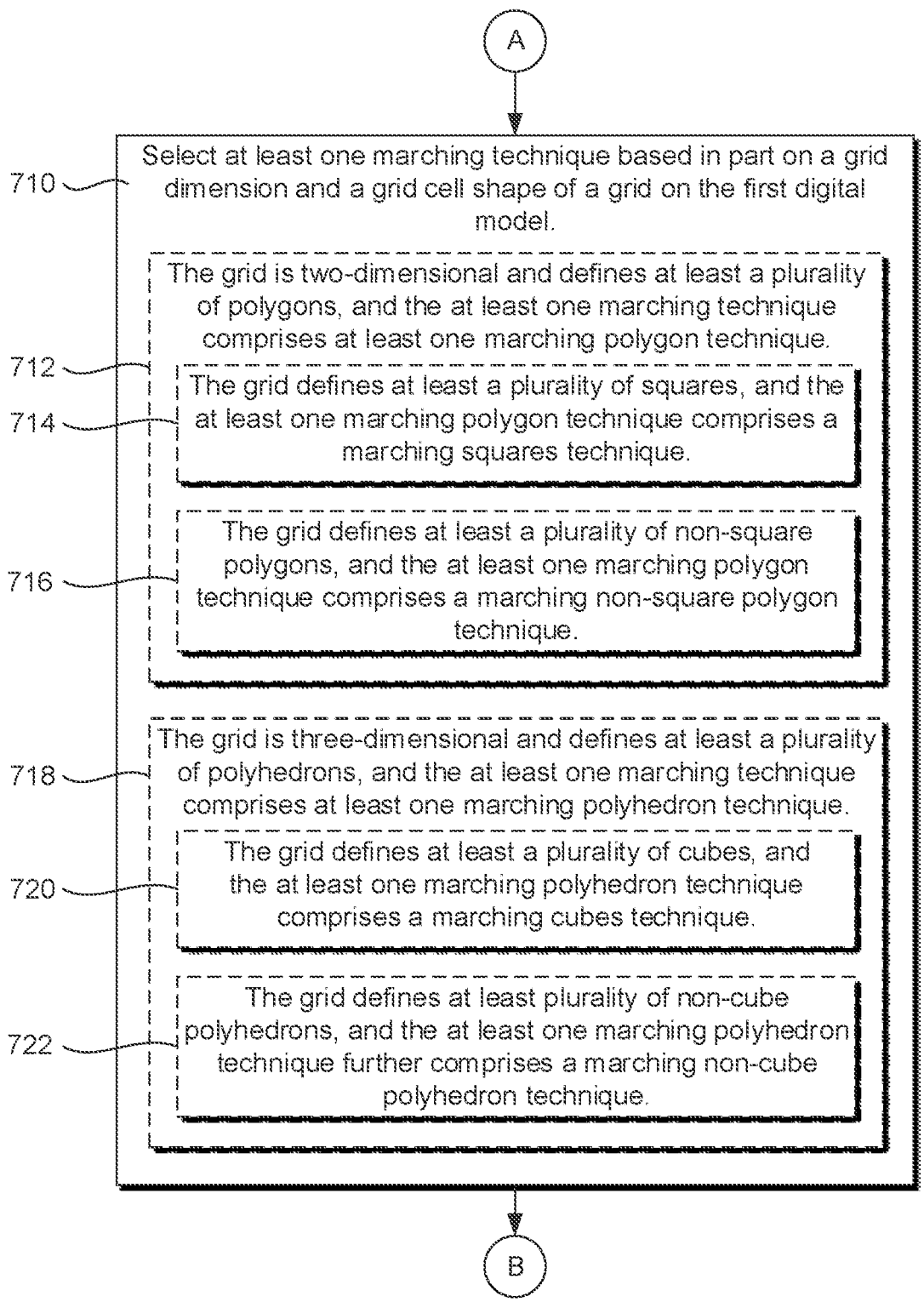
Figure 7C:
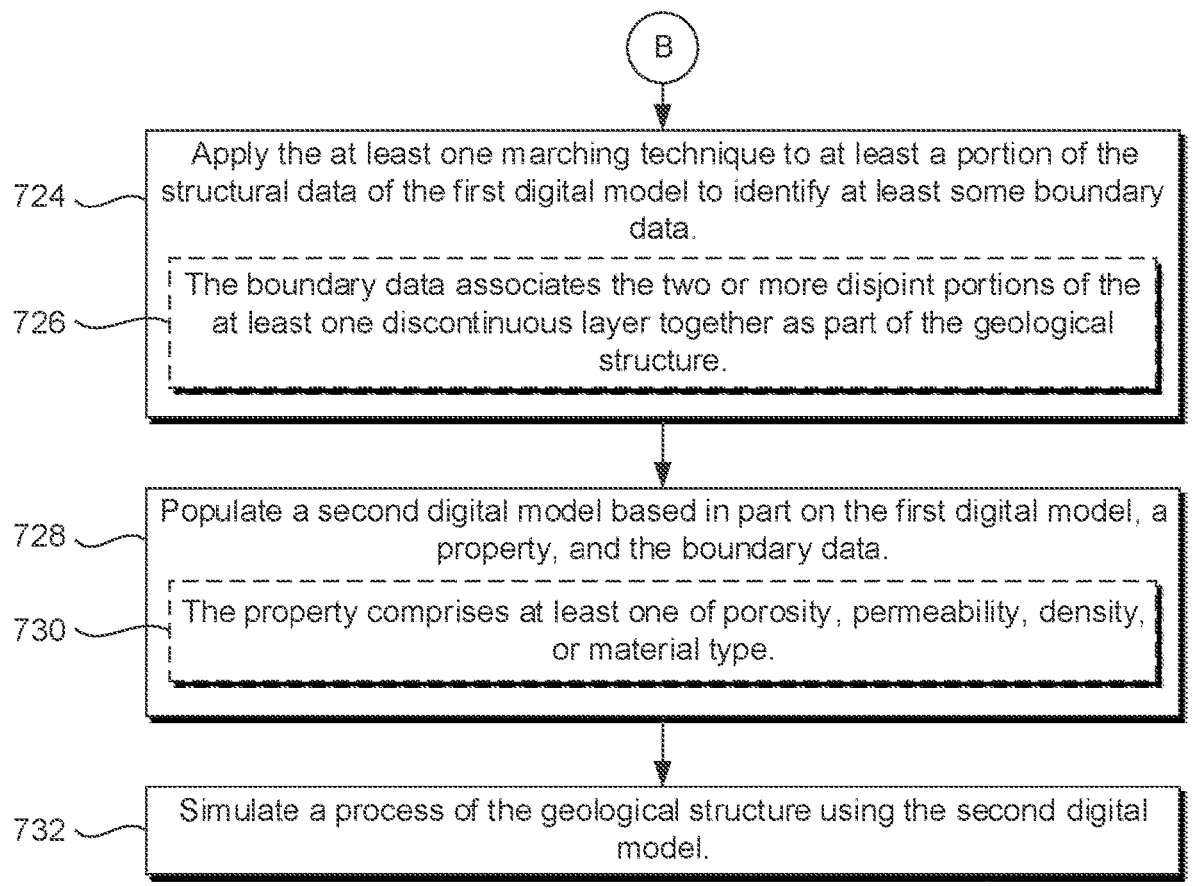

Attention is now directed to FIGS. 7A, 7B, and 7C, which are flow diagrams illustrating a method 700 of simulating a process of a geological structure, in accordance with some embodiments. Some operations in method 700 may be combined and/or the order of some operations may be changed. Further, some operations in method 700 may be combined with aspects of the example workflows of FIGS. 5 and/or 6, and/or the order of some operations in method 700 may be changed to account for incorporation of aspects of the workflow illustrated by one or more of FIGS. 5 and/or 6. The techniques of FIGS. 7A, 7B, and 7C may be implemented at least partially on the system shown and described below in reference to FIG. 8. Further, it will be appreciated that the illustrated and below-described blocks in this method 700 may be combined, separated into two or more blocks, re-ordered, or performed simultaneously (e.g., in parallel).

Referring now specifically to the illustrated embodiments, as shown in FIG. 7A, the method 700 may include obtaining a first digital model comprising structural data representing a geological structure, as at 702 (e.g., FIG. 5, 502, represent geological domain in digital model, and FIG. 6, 602, obtain first digital model). In an embodiment, the obtaining a first digital model comprising structural data representing a geological structure may include that the structural data of the first digital model includes an implicit function, as at 704. It will be appreciated, however, that embodiments that omit block 704 are specifically contemplated herein. In an embodiment, the obtaining a first digital model comprising structural data representing a geological structure may include that the geological structure has at least one discontinuous layer including two or more disjoint portions, as at 706. It will be appreciated, however, that embodiments that omit block 706 are specifically contemplated herein.

The method 700 may also include imposing a grid on the first digital model, as at 708 (e.g., FIG. 6, 604, identify boundary data). It will be appreciated, however, that embodiments that omit block 604 are specifically contemplated herein.

The method 700 also includes selecting at least one marching technique based in part on a grid dimension and a grid cell shape of a grid on the first digital model, as at 710 (e.g., FIG. 6, 604, identify boundaries).

In an embodiment, the selecting at least one marching technique based in part on a grid dimension and a grid cell shape of a grid on the first digital model may include that the grid is two-dimensional and defines at least a plurality of polygons, and the at least one marching technique includes at least one marching polygons technique, as at 712. It will be appreciated, however, that embodiments that omit block 712 are specifically contemplated herein. In an embodiment, that the grid is two-dimensional and defines at least a plurality of polygons, and that the at least one marching technique includes at least one marching polygons technique may include that the grid defines at least plurality of squares, and that the at least one marching polygon technique includes a marching squares technique, as at 714. It will be appreciated, however, that embodiments that omit block 714 are specifically contemplated herein. In an embodiment, that the grid is two-dimensional and defines at least a plurality of polygons, and that the at least one marching technique includes at least one marching polygons technique may include that the grid defines at least a plurality of non-square polygons, and that the at least one marching non-square polygon technique further includes a marching non-square polygon technique, as at 716. It will be appreciated, however, that embodiments that omit block 716 are specifically contemplated herein.

In an embodiment, the selecting at least one marching technique based in part on a grid dimension and a grid cell shape of a grid on the first digital model may include that the grid is three-dimensional and defines at least a plurality of polyhedrons, and that the at least one marching technique includes at least one marching polyhedron technique, as at 718. It will be appreciated, however, that embodiments that omit block 718 are specifically contemplated herein. In an embodiment, that the grid is three-dimensional and defines at least a plurality of polyhedrons, and that the at least one marching technique includes at least one marching polyhedron technique, may include that the grid defines at least a plurality of cubes, and that the at least one marching polyhedron technique includes a marching cubes technique, as at 720. It will be appreciated, however, that embodiments that omit block 720 are specifically contemplated herein. In an embodiment, that the grid is three-dimensional and defines at least a plurality of polyhedrons, and that the at least one marching technique includes at least one marching polyhedron technique, may include that the grid defines at least a plurality of non-cube polyhedrons, and that the at least one marching technique includes a marching non-cube polyhedron technique, as at 722. It will be appreciated, however, that embodiments that omit block 722 are specifically contemplated herein.

The method 700 also includes applying the at least one marching technique to at least a portion of the structural data of the first digital model to identify at least some boundary data, as at 724 (e.g., FIG. 6, 604, identify boundaries). In an embodiment, the applying the at least one marching technique to at least a portion of the structural data of the first digital model to identify at least some boundary data may include that the boundary data associates the two or more disjoint portions of the at least one discontinuous layer together as part of the geological structure, as at 726. It will be appreciated, however, that embodiments that omit block 726 are specifically contemplated herein.

The method 700 also includes populating a second digital model based in part on the first digital model, a property, and the boundary data, as at 728 (e.g., FIG. 6, 606, populate second digital model). In an embodiment, the populating a second digital model based in part on the first digital model, a property, and the boundary data may include that the property includes at least one of porosity, permeability, density, or material type, as at 730. It will be appreciated, however, that embodiments that omit block 730 are specifically contemplated herein.

The method 700 may also include simulating a process of the geological structure using the second digital model, as at 732 (e.g., FIG. 6, 608, simulate process).

III. Example Hardware and Other Equipment

In one or more examples, the functions described can be implemented in hardware, software, firmware, or any combination thereof. For a software embodiment, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 8:
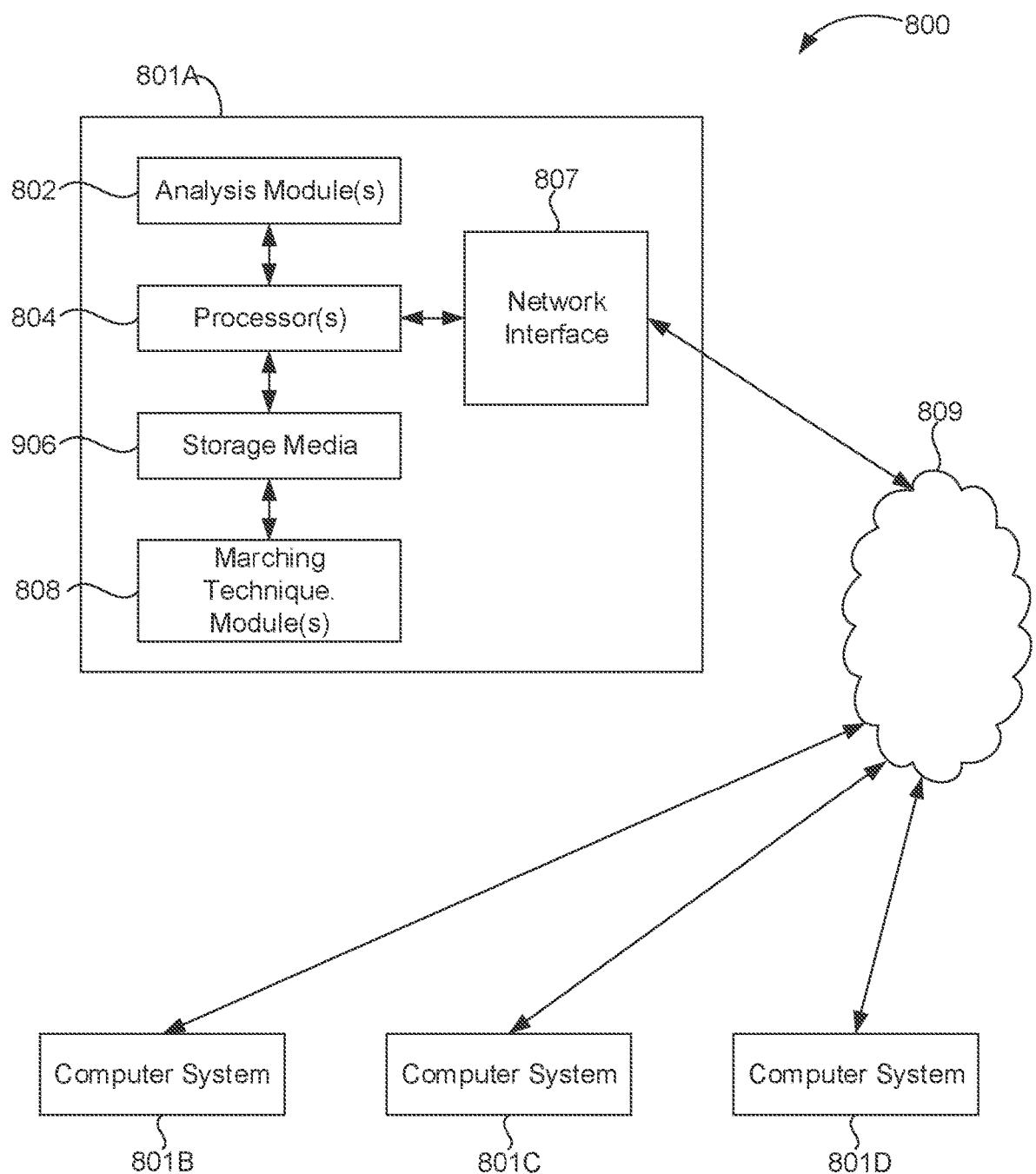
FIG. 8 illustrates a schematic view of a computing system, according to an embodiment.

In some examples, any of the methods of the present disclosure may be executed by a computing system. FIG. 8 illustrates an example of such a computing system 800, in accordance with some examples. The computing system 800 may include a computer or computer system 801A, which may be an individual computer system 801A or an arrangement of distributed computer systems. The computer system 801A includes one or more analysis module(s) 802 configured to perform various tasks according to some examples, such as one or more methods disclosed herein. To perform these various tasks, the analysis module 802 executes independently, or in coordination with, one or more processors 804, which is (or are) connected to one or more storage media 906. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 906 can be implemented as one or more computer-readable or machine-readable storage media. Note that while in the example embodiment of FIG. 8 storage media 906 is depicted as within computer system 801A, in some embodiments, storage media 906 may be distributed within and/or across multiple internal and/or external enclosures of computing system 801A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 800 contains one or more marching technique module(s) 808. In the example of computing system 800, computer system 801A includes the marching technique module 808. In some embodiments, the marching technique module may store and/or apply a library of cell contours as disclosed herein.

It should be appreciated that computing system 800 is one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the blocks in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims.

What is claimed is:

1. A computer-implemented method of simulating a process of a geological structure, the method comprising:
obtaining a first digital model comprising structural data representing a geological structure, wherein the geological structure comprises a folded and faulted geological domain, wherein the folded and faulted geological domain comprises a discontinuous layer that includes two or more disjoint portions that are not physically connected, wherein the first digital model is a 2D model that comprises an implicit function that assigns different values to represent different materials in the folded and faulted geological domain, wherein the implicit function receives a coordinate of the folded and faulted geological domain as an input, wherein the implicit function generates one of the values corresponding to one of the materials present at a location of the coordinate as an output, wherein the implicit function defines isolines and isobands, wherein the isolines have a same value in the implicit function, wherein the isolines represent boundaries between two or more layers in the folded and faulted geological domain, and wherein the isobands are between the isolines and represent the materials in the two or more layers;
selecting at least one marching technique based in part on a grid dimension and a grid cell shape of a grid on the first digital model;
applying the at least one marching technique to at least a portion of the structural data of the first digital model to identify at least some boundary data;
populating a second digital model based in part on the first digital model, a property, and the boundary data;
performing a simulated process of the geological structure using the second digital model, wherein the simulated process comprises simulated fluid extraction from the geological structure, simulated fluid injection into the geological structure, or simulated wellbore insertion into the geological structure; and
causing part of an actual process to occur in response to results of the simulated process, wherein the actual process comprises actual fluid extraction from the geological structure, actual fluid injection into the geological structure, or actual wellbore insertion into the geological structure.

2. The method of claim 1, wherein the implicit function maps geological positions to numeric representations of geological properties at the geological positions.

3. The method of claim 1, wherein:
the geological structure has at least one discontinuous layer comprising two or more disjoint portions; and
the boundary data associates the two or more disjoint portions of the at least one discontinuous layer together as part of the geological structure.

4. The method of claim 1, wherein:
the grid is two-dimensional and defines at least a plurality of polygons; and
the at least one marching technique comprises at least one marching polygon technique.

5. The method of claim 4, wherein:
the grid defines at least a plurality of squares; and
the at least one marching polygon technique comprises a marching squares technique.

6. The method of claim 5, wherein:
the grid defines at least a plurality of non-square polygons; and
the at least one marching polygon technique comprises a marching non-square polygon technique.

7. The method of claim 1, wherein:
the grid is three-dimensional and defines at least a plurality of polyhedrons; and
the at least one marching technique comprises at least one marching polyhedron technique.

8. The method of claim 7, wherein:
the grid defines at least a plurality of cubes; and
the at least one marching polyhedron technique comprises a marching cubes technique.

9. The method of claim 7, wherein:
the grid defines at least a plurality of non-cube polyhedrons; and
the at least one marching polyhedron technique comprises a marching non-cube polyhedron technique.

10. The method of claim 1, wherein the property comprises at least one of: porosity, permeability, density, or material type.

11. The method of claim 1, further comprising imposing the grid on the first digital model.

12. The method of claim 1, wherein the boundary data associates the two or more disjoint portions together as part of the geological structure, and wherein, once the two or more disjoint portions are associated together, the property is then represented in one other of the two or more disjoint portions.

13. The method of claim 1, wherein, once the property is determined to exist in one of the two or more disjoint portions, the property is then represented in the other of the two or more disjoint portions.

14. The method of claim 1, wherein the at least one marching technique generates contours corresponding to the isolines, wherein the contours encompass the isobands representing the two or more disjoint portions, and wherein the isobands corresponding to the two or more disjoint portions of the same discontinuous layer have matching values of the implicit function.

15. A system for simulating a process of a geological structure, the system comprising:
at least one electronic persistent memory storing a first digital model comprising structural data representing a geological structure, wherein the geological structure comprises a folded and faulted geological domain, wherein the folded and faulted geological domain comprises a discontinuous layer that includes two or more disjoint portions that are not physically connected, wherein the first digital model is a 2D model that comprises an implicit function that assigns different values to represent different materials in the folded and faulted geological domain, wherein the implicit function receives a coordinate of the folded and faulted geological domain as an input, wherein the implicit function generates one of the values corresponding to one of the materials present at a location of the coordinate as an output, wherein the implicit function defines isolines and isobands, wherein the isolines have a same value in the implicit function, wherein the isolines represent boundaries between two or more layers in the folded and faulted geological domain, and wherein the isobands are between the isolines and represent the materials in the two or more layers; and
at least one electronic processor that executes instructions to perform operations comprising:
selecting at least one marching technique based in part on a grid dimension and a grid cell shape of a grid on the first digital model;
applying the at least one marching technique to at least a portion of the structural data of the first digital model to identify at least some boundary data;
populating a second digital model based in part on the first digital model, a property, and the boundary data;
performing a simulated process of the geological structure using the second digital model, wherein the simulated process comprises simulated fluid extraction from the geological structure, simulated fluid injection into the geological structure, or simulated wellbore insertion into the geological structure; and
causing part of an actual process to occur in response to results of the simulated process, wherein the actual process comprises actual fluid extraction from the geological structure, actual fluid injection into the geological structure, or actual wellbore insertion into the geological structure.

16. A non-transitory computer-readable medium storing instructions that, when executed by at least one processor, are configured to cause a computing system to perform operations, the operations comprising:
obtaining a first digital model comprising structural data representing a geological structure, wherein the geological structure comprises a folded and faulted geological domain, wherein the folded and faulted geological domain comprises a discontinuous layer that includes two or more disjoint portions that are not physically connected, wherein the first digital model is a 3D model that comprises an implicit function that assigns different values to represent different materials in the folded and faulted geological domain, wherein the implicit function receives a coordinate of the folded and faulted geological domain as an input, wherein the implicit function generates one of the values corresponding to one of the materials present at a location of the coordinate as an output, wherein the implicit function defines isosurfaces and volumetric objects, wherein the isosurfaces have a same value in the implicit function, and wherein the volumetric objects are between the isosurfaces;
selecting at least one marching technique based in part on a grid dimension and a grid cell shape of a grid on the first digital model;

applying the at least one marching technique to at least a portion of the structural data of the first digital model to identify at least some boundary data;

populating a second digital model based in part on the first digital model, a property, and the boundary data;

performing a simulated process of the geological structure using the second digital model, wherein the simulated process comprises simulated fluid extraction from the geological structure, simulated fluid injection into the geological structure, or simulated wellbore insertion into the geological structure; and causing part of an actual process to occur in response to results of the simulated process, wherein the actual process comprises actual fluid extraction from the geological structure, actual fluid injection into the geological structure, or actual wellbore insertion into the geological structure.

* * * * *